United States Patent
Matsui et al.

(10) Patent No.: US 11,608,856 B2
(45) Date of Patent: Mar. 21, 2023

(54) LINEAR MOTION GUIDE UNIT

(71) Applicant: NIPPON THOMPSON CO., LTD., Tokyo (JP)

(72) Inventors: Masashi Matsui, Mino (JP); Masatoshi Kondo, Mino (JP); Yusuke Yamaguchi, Mino (JP); Junji Matsui, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 17/550,199

(22) Filed: Dec. 14, 2021

(65) Prior Publication Data
US 2022/0186779 A1   Jun. 16, 2022

(30) Foreign Application Priority Data
Dec. 14, 2020 (JP) .............................. JP2020-206679

(51) Int. Cl.
*F16C 29/06* (2006.01)

(52) U.S. Cl.
CPC .......... *F16C 29/0602* (2013.01); *F16C 29/06* (2013.01)

(58) Field of Classification Search
CPC .. F16C 29/06; F16C 29/0602; F16C 29/0607; F16C 29/0609; F16C 29/0633; F16C 29/0647; F16C 29/086; F16C 33/664; F16C 33/6648; F16C 33/6655
See application file for complete search history.

(56) References Cited

U.S. PATENT DOCUMENTS

| | | | | |
|---|---|---|---|---|
| 6,082,899 A | * | 7/2000 | Suzuki | F16C 33/6622 184/5 |
| 6,877,900 B2 | * | 4/2005 | Mochizuki | F16C 29/088 384/15 |
| 9,816,559 B2 | * | 11/2017 | Chiu | F16C 33/6685 |
| 10,774,872 B2 | * | 9/2020 | Matsumoto | F16C 33/664 |
| 2002/0039458 A1 | * | 4/2002 | Ishihara | F16C 29/063 384/45 |

FOREIGN PATENT DOCUMENTS

| | | |
|---|---|---|
| JP | 1999351251 A | 12/1999 |
| JP | 20043544 A | 1/2004 |

* cited by examiner

*Primary Examiner* — James Pilkington
(74) *Attorney, Agent, or Firm* — Browdy and Neimark, PLLC (57) ABSTRACT

A linear motion guide unit includes a rail, a slider slidable relative to the rail, and rolling elements rollable in a rolling groove formed with the rail and the slider. The slider has a lubricating oil supply device provided at least at one end face thereof. The lubricating oil supply device includes a lubricating member that retains lubricating oil and abuts against a raceway surface of the rail to supply the lubricating oil to the rail, a housing having front, rear, and bottom surfaces covering front, rear, and bottom surfaces of the lubricating member, with an upper surface of the housing being left open, and a cover that covers at least an upper surface of the lubricating member. The housing is fixed to the slider with a first fixing member. The cover is fixed to the housing with a second fixing member, without being fixed with the first fixing member.

7 Claims, 9 Drawing Sheets

LINEAR MOTION GUIDE UNIT

BACKGROUND OF THE INVENTION

1. Field of the Invention

The present invention relates to a linear motion guide unit. The present application claims priority based on Japanese Patent Application No. 2020-206679 filed on Dec. 14, 2020, the entire contents of which are incorporated herein by reference.

2. Description of the Related Art

A linear motion guide unit which includes a rail, a slider sliding on the rail, and a lubricating oil supply device including a lubricating oil retaining member that supplies lubricating oil to the sliding section is known (see, for example, Patent Literature 1).

There is also known a linear motion guide unit including a rail, a slider sliding on the rail, and a lubricating oil retaining member, which includes separate right and left cartridges each containing the lubricating oil retaining member (see, for example, Patent Literature 2).

CITATION LIST

Patent Literature

Patent Literature 1: Japanese Patent Application Laid-Open No. H11-351251
Patent Literature 2: Japanese Patent Application Laid-Open No. 2004-3544

Conventionally, in a linear motion guide unit, a lubricating oil supply device fixed to an end face of a slider in the longitudinal direction is known. The lubricating oil supply device has a lubricating member arranged to abut against a raceway surface of a rail. When the slider slides on the rail, the lubricating member supplies lubricating oil to the rail. The lubricating oil retained in the lubricating member is consumed as the linear motion guide unit operates. Therefore, it was necessary to replenish the lubricating member with lubricating oil or to replace the lubricating member in a timely manner.

For example, in the linear motion guide unit of Patent Literature 1, a lubricating plate that retains lubricating oil is fixed to a carriage of the slider by bolts together with an end seal and an end cap. Therefore, when the lubricating plate is replaced, the end seal and the end cap must also be removed. However, removing the end seal and the end cap and then reattaching them is a complicated process. In particular, when the end seal and the end cap are reattached after the replacement of the lubricating plate, precise work would be required to prevent misalignment between the parts. On the other hand, in the linear motion guide unit of Patent Literature 2, the cartridge retaining the lubricating oil is configured as separate pieces on right and left sides, allowing the cartridge pieces to be pulled out from the right and left sides. However, in the linear motion guide unit of Patent Literature 2 as well, the end cap, the lubricating oil cartridge, and the holder are attached as a single unit to the slider by bolts, making it at least necessary to loosen the bolts for replacement of the cartridge. With the bolts loosened, there was a possibility that the end cap would shift.

Therefore, a configuration of a lubricating oil supply device was investigated in which the lubricating member can be replaced more easily with less risk of causing misalignment of other parts when replacing the lubricating member. Then, an idea was obtained to use different fixing members for fixing a housing of the lubricating oil supply device to the slider and for securing a cover covering the lubricating member. As a result of further investigation, a configuration was attained in which a first fixing member secures the housing of the lubricating oil supply device to the slider, and a second fixing member secures the cover of the lubricating oil supply device to the housing, and the cover is not secured by the first fixing member. According to these configurations, it is possible to remove the cover of the lubricating oil supply device by merely loosening (removing) the second fixing member, without loosening the first fixing member. Therefore, a lubricating oil supply device that is easier to handle is obtained in which replacement of the lubricating member or replenishment of the lubricating oil is easier and the problem of misalignment with the slider is less likely to occur.

SUMMARY OF THE INVENTION

The lubricating oil supplied to the rail is consumed with the operation of the linear motion guide unit. It is therefore desired that the lubricating oil supply device is capable of replenishing the lubricating oil or replacing the lubricating oil retaining member. In the case where the lubricating oil retaining member is replaced, it is desired that the lubricating oil retaining member can be replaced easily. Thus, it is an object of the present invention to provide a linear motion guide unit which is capable of easy replacement of the lubricating oil retaining member and is excellent in maintainability.

A linear motion guide unit according to the present disclosure includes a rail, a slider slidable relative to the rail, and rolling elements rollable in a rolling groove formed with the rail and the slider. The slider has a lubricating oil supply device provided at least at one end face thereof. The lubricating oil supply device includes a lubricating member, a housing, and a cover. The lubricating member retains lubricating oil and abuts against a raceway surface of the rail to supply the lubricating oil to the rail. The housing has front, rear, and bottom surfaces covering front, rear, and bottom surfaces of the lubricating member, with an upper surface of the housing being left open. The cover covers at least an upper surface of the lubricating member. The housing is fixed to the slider with a first fixing member. The cover is fixed to the housing with a second fixing member, without being fixed with the first fixing member.

The linear motion guide unit described above facilitates replacement of the lubricating oil retaining member and is excellent in maintainability.

DESCRIPTION OF THE PREFERRED EMBODIMENTS

Outline of Embodiments

Firstly, embodiments of the present disclosure will be listed and described. A linear motion guide unit according to the present disclosure includes a rail, a slider slidable relative to the rail, and rolling elements rollable in a rolling groove formed with the rail and the slider. The slider has a lubricating oil supply device provided at least at one end face thereof. The lubricating oil supply device includes a lubricating member, a housing, and a cover. The lubricating member retains lubricating oil and abuts against a raceway surface of the rail to supply the lubricating oil to the rail. The housing has front, rear, and bottom surfaces covering front, rear, and bottom surfaces of the lubricating member, with an upper surface of the housing being left open. The cover covers at least an upper surface of the lubricating member. The housing is fixed to the slider with a first fixing member. The cover is fixed to the housing with a second fixing member, without being fixed with the first fixing member.

In the linear motion guide unit described above, the housing may have, in addition to the front surface, the rear surface, and the bottom surface, side surface portions extending in a side surface direction from outer ends of the front surface and the rear surface, respectively, wherein the side surface portion extending from the front surface and the side surface portion extending from the rear surface have a spacing therebetween. With this configuration, the cover can be held reliably in place and can be removed more easily.

In the linear motion guide unit described above, the lubricating member may be composed of two members on right and left sides with respect to a longitudinal direction of the rail. The lubricating member may have a thickness that is equal to or smaller than a width of the spacing between the side surface portion extending from the front surface and the side surface portion extending from the rear surface of the housing. With this configuration, the lubricating member can be removed from each of the right and left sides of the housing when the cover is removed, so the lubricating member can be replaced more easily.

In the linear motion guide unit described above, the lubricating member may have a protruding portion that protrudes outwardly at a position on the side surface corresponding to the raceway surface of the rail. With this configuration, the protruding portion of the lubricating member abuts against the side surfaces of the housing and the cover, and the lubricating member is pushed inwardly by the housing and the cover and thus pressed against the rail. This makes the rail and the lubricating member come into close contact with each other, allowing the lubricating oil to be reliably applied to the rail.

In the linear motion guide unit described above, the housing may have, at a portion of the bottom surface opposing the rail, a tapered portion that protrudes toward the rail. This configuration prevents dust or the like from entering from the bottom surface of the lubricating oil supply device.

In the linear motion guide unit described above, the cover may have tip ends of the side portions formed in a tapered shape. This configuration facilitates insertion and removal of the cover with respect to the housing. In particular, the side portions of the cover can each be inserted easily into between the lubricating member and the side surface portions of the housing.

DESCRIPTION OF SPECIFIC EMBODIMENTS

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

Figure 1A:
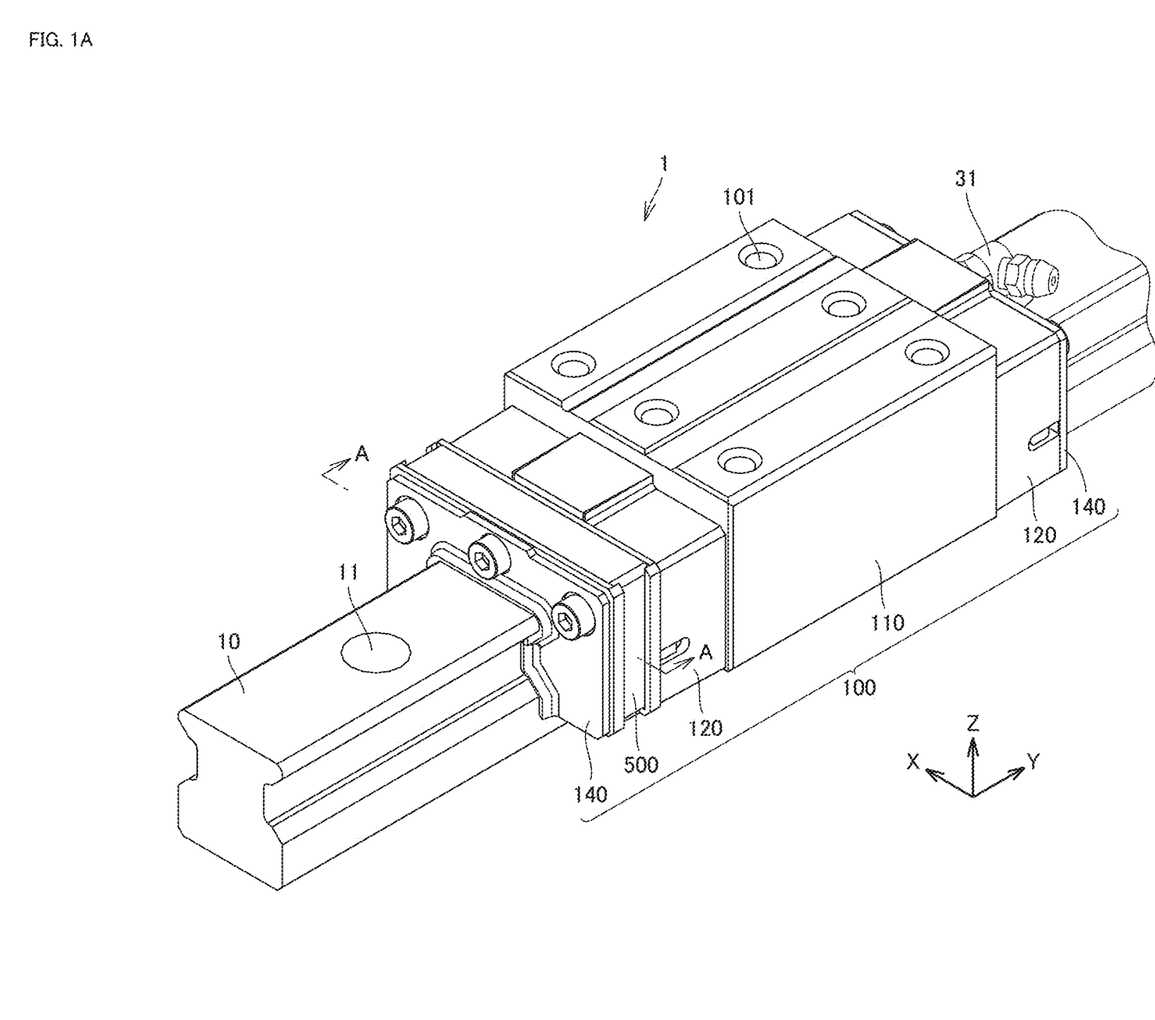
FIG. 1A is a perspective view showing the structure of a linear motion guide unit in Embodiment 1.
Figure 1B:
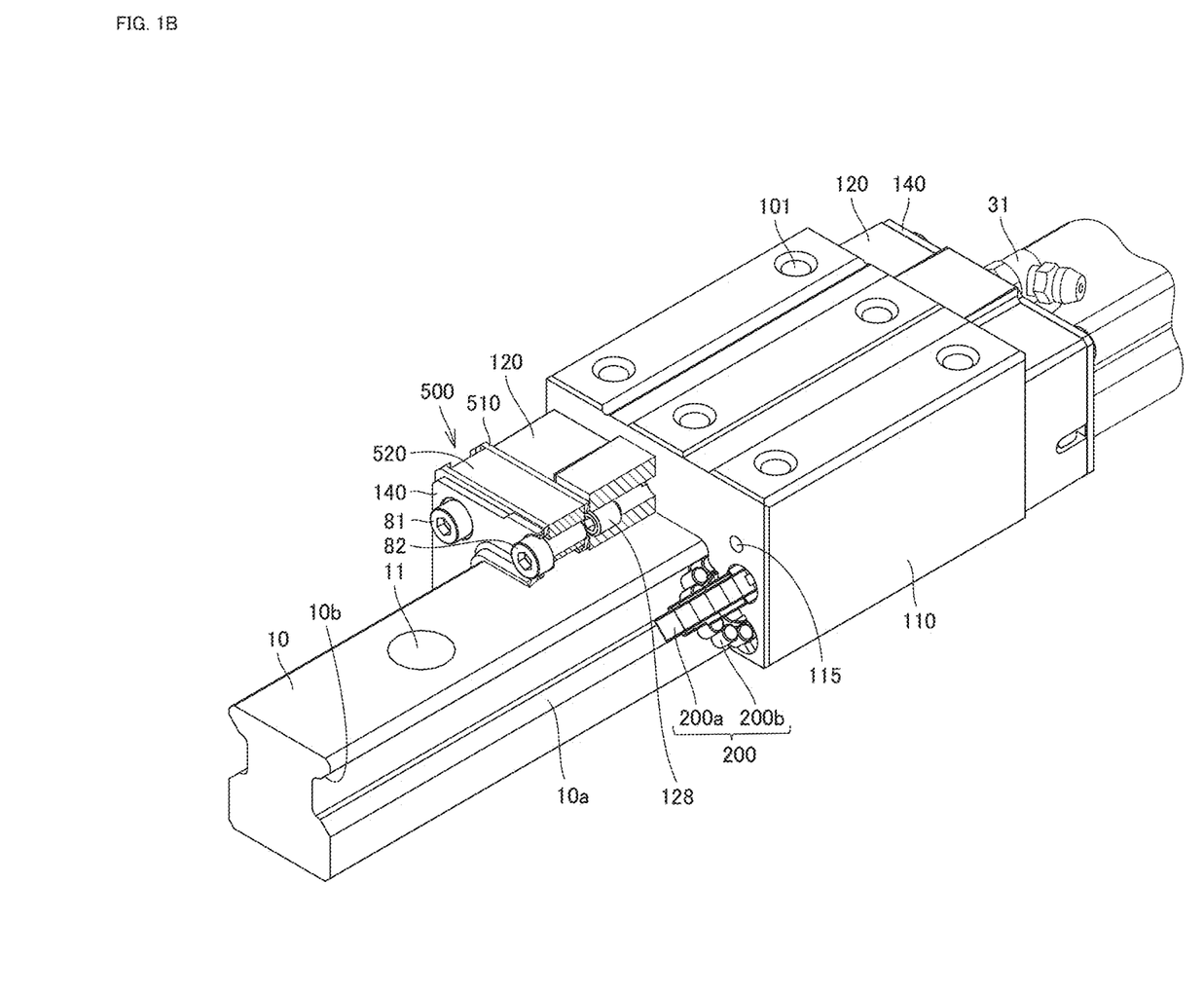
FIG. 1B is a partially cutaway perspective view showing the structure of the linear motion guide unit in Embodiment 1.

FIG. 1A is a perspective view showing the structure of a linear motion guide unit 1 as Embodiment 1 of the present disclosure. In FIG. 1A, the X axis direction is a width direction of the linear motion guide unit 1, the Y axis direction is a longitudinal direction of the linear motion guide unit 1 (rail 10), and the Z axis direction is a thickness direction of the linear motion guide unit 1. FIG. 1B is a partially cutaway perspective view of the linear motion guide unit 1 of FIG. 1A.

First, the overall configuration of the linear motion guide unit 1 will be described.

Referring to FIGS. 1A and 1B, the linear motion guide unit 1 includes a rail 10, a slider 100, and rollers 200 as rolling elements. The slider 100 fits over the rail 10 and is slidable relative to the rail 10. The slider 100 has a platform-shaped portion that is a top portion, and sleeve portions that hang down from both side ends of the platform-shaped portion. The slider 100 has a carriage 110 and end caps 120 attached to both ends in a length direction of the carriage 110. Further, one of the end caps 120 has an end face opposite to the carriage 110 where a lubricating oil supply device 500 is provided. The lubricating oil supply device 500 has an end face opposite to the end cap 120 where an end seal 140 is attached. The other end cap 120 has an end face opposite to the carriage 110 where no lubricating oil supply device is provided and an end seal 140 is attached. At an outside of the end seal 140 on the side where no lubricating oil supply device is disposed, a grease nipple 31 is attached.

The rail 10 is provided with a mounting hole 11 for fixing a counterpart to which the linear motion guide unit 1 is mounted. The carriage 110 has an upper surface where a plurality of holes 101 are formed, which are screw holes for mounting a counterpart such as a work or equipment.

Figure 2:
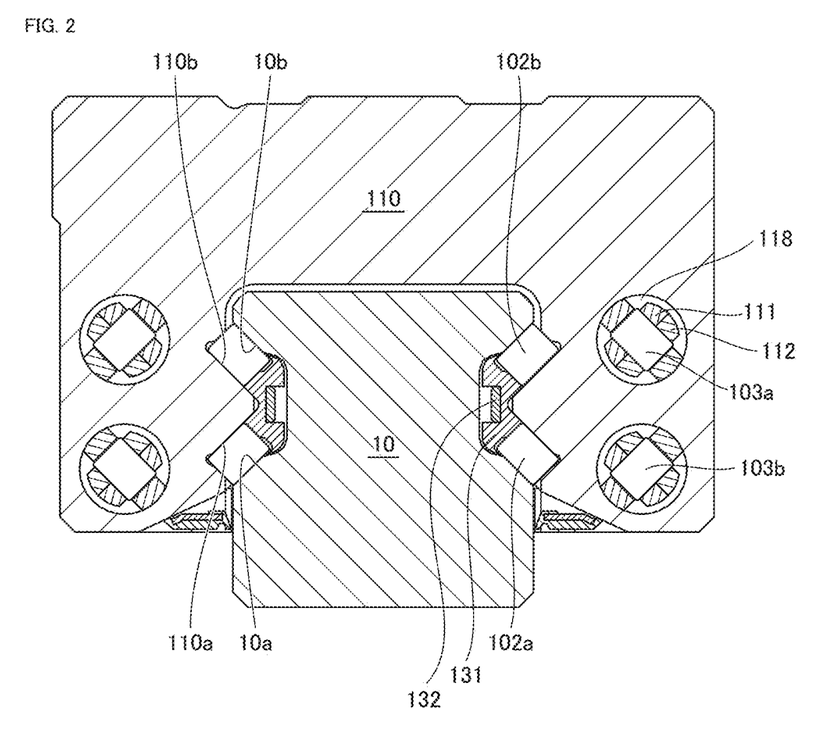
FIG. 2 is a cross-sectional view of a slider and a rail included in the linear motion guide unit in Embodiment 1.

FIG. 2 is a cross-sectional view showing particularly the carriage 110 and the rail 10 of the linear motion guide unit 1. Referring to FIGS. 1B and 2, the rail 10 has side surfaces on which two pairs of upper and lower raceway surfaces 10a and 10b are formed along the longitudinal direction. The carriage 110 has raceway surfaces 110a and 110b formed at positions opposing the raceway surfaces 10a and 10b. The raceway surfaces 10a and 110a and the raceway surfaces 10b and 110b form load-carrying races 102a and 102b, respectively, as rolling grooves that are load areas. That is, the linear motion guide unit 1 has two (upper and lower) rolling grooves on each side. The rollers 200 roll on the rolling grooves according to the movement of the slider 100. Inside the carriage 110, circulation passages 103*a* and 103*b* as no-load areas are formed, which are continuous with the load-carrying races 102*a* and 102*b*, respectively. Although not shown in the figure, in the end cap 120, two turnaround passages as no-load areas are formed to connect between the load-carrying race 102*a* and the circulation passage 103*a*, and between the load-carrying race 102*b* and the circulation passage 103*b*.

Figure 9:
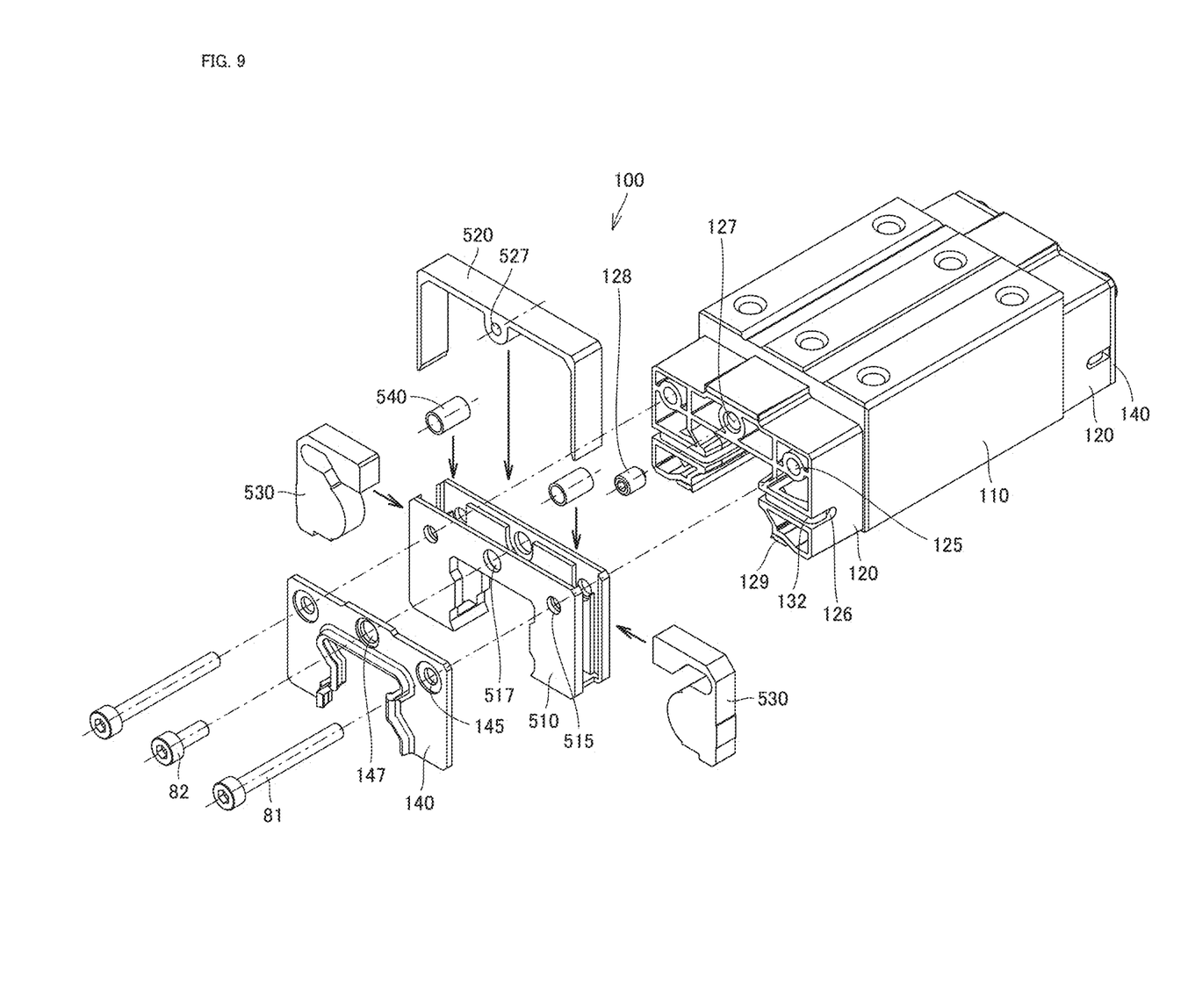
FIG. 9 is an exploded perspective view showing the structure of the slider in Embodiment 1.

FIG. 9 is an exploded perspective view showing the structure of the slider 100. Referring to FIGS. 1A, 1B, and 9, the carriage 110 has an end face on which a hole 115 is formed, which is a screw hole for mounting the end cap 120. The end cap 120 has a hole 125, formed at a position corresponding to the hole 115 of the carriage 110, which is a screw hole that penetrates the end cap 120 in the thickness direction. The lubricating oil supply device 500 has a housing 510, which has a hole 515, a screw hole, formed at a position corresponding to the holes 115 and 125. The end seal 140 also has a hole 145, a screw hole, formed at a position corresponding to the holes 115, 125, and 515. A screw 81 as a first fixing member is inserted into the holes 145, 515, 125, and 115. In other words, the screw 81 secures the end seal 140, the housing 510, and the end cap 120 to the carriage 110. The holes 145, 515, 125, and 115 are provided at two locations on the upper right and left when viewed in the end face direction of the slider 100.

Figure 3:
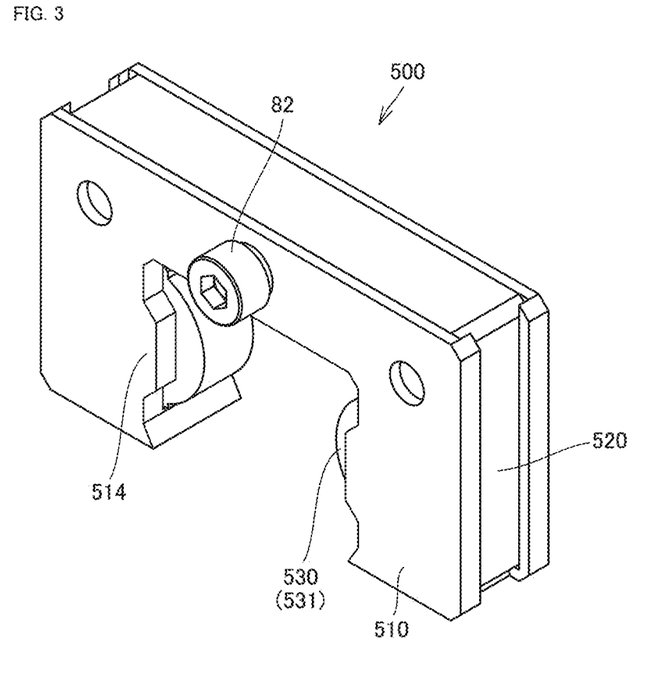
FIG. 3 is a perspective view showing a lubricating oil supply device in Embodiment 1.

FIG. 3 is a perspective view showing particularly the lubricating oil supply device 500 in Embodiment 1. The lubricating oil supply device 500 includes the housing 510, a cover 520, and a lubricating member 530. The housing 510 has an upper surface left open to allow the cover 520 to be inserted and removed through the upper surface of the housing 510. Referring to FIGS. 1B and 3, the housing 510 and the cover 520 are fixed to each other by a screw 82 as a second fixing member. The screw 82 secures the end seal 140, the housing 510, and the cover 520. The screw 82 does not reach the end cap 120.

That is, the screws 81 fix the end seal 140, the housing 510 of the lubricating oil supply device 500, and the end cap 120 to the carriage 110, whereas the screw 82 fixes the end seal 140, the housing 510 of the lubricating oil supply device 500, and the cover 520. The cover 520 is not fixed by the screws 81. This configuration allows the cover 520 to be removed by removing the screw 82, with the end seal 140, the housing 510, and the end cap 120 kept fixed to the carriage 110.

The lubricating oil supply device 500 will now be described in more detail. In the following description, the "front surface" refers to an outer surface (a surface far from the carriage 110) with reference to the carriage 110 when the slider 100 is viewed in the longitudinal direction. The "rear surface" refers to an inner surface (a surface close to the carriage 110) with reference to the carriage 110 when the slider 100 is viewed in the longitudinal direction. The "bottom surface" and the "upper surface" refer to the lower side and the upper side, respectively, of the linear motion guide unit 1, and the "side surface" refers to a surface extending in a direction along the side surface of the rail 10.

Figure 4:
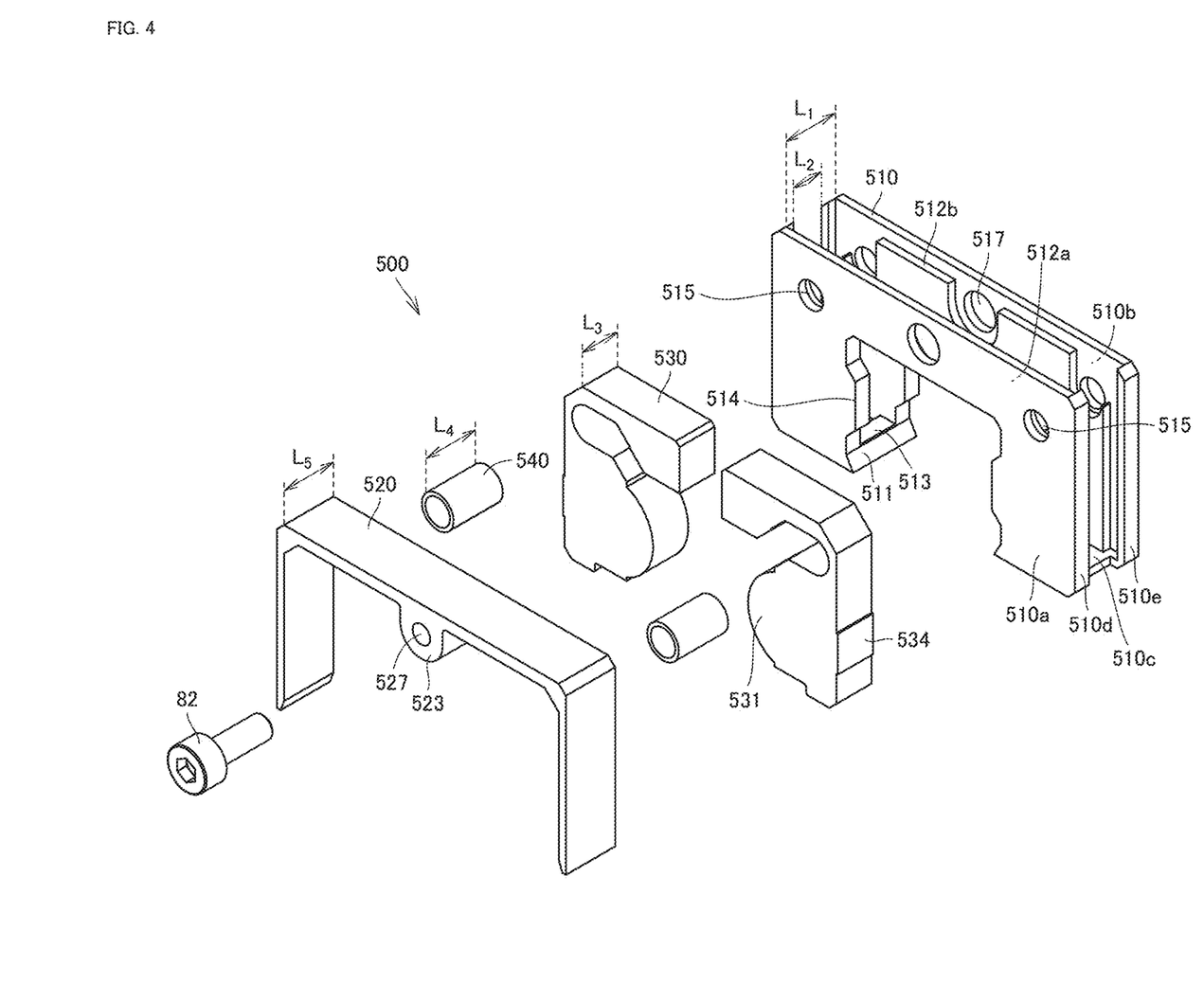
FIG. 4 is a perspective view showing, in an exploded view, the lubricating oil supply device in FIG. 3.

FIG. 4 is an exploded perspective view showing the configuration of the lubricating oil supply device 500. Referring to FIG. 4, the lubricating oil supply device 500 includes the housing 510, the cover 520, the lubricating member 530 that is composed of two (right and left) parts, a collar 540, and the screw 82. Referring to FIGS. 3 and 4, the lubricating member 530 is housed in the housing 510 and covered with the cover 520.

The housing 510 will be described with reference to FIGS. 3 and 4. The housing 510 includes a first surface 510*a*, which is the front surface, a second surface 510*b*, which is the rear surface, and a third surface 510*c*, which is the bottom surface. The first surface 510*a* and the second surface 510*b* have a recess formed from the bottom surface upwardly at the center of the width direction so as to straddle the rail 10. The wall surface defining the recess has a convex portion 514 formed at a central portion in the height direction so as to follow the shape of the side surface of the rail. In other words, the recess, which is an opening of the housing 510, has a portion narrower than the maximum width of the rail 10. The first surface 510*a* and the second surface 510*b* cover the front surface and the rear surface, respectively, of the lubricating member 530. The third surface 510*c*, which is the bottom surface of the housing 510, connects the first surface 510*a* and the second surface 510*b*. Side surface portions 510*d* extend in aside surface direction from both ends in the width direction of the first surface 510*a* toward the second surface 510*b*. Side surface portions 510*e* extend in the side surface direction from outer ends of the second surface 510*b* toward the first surface 510*a*. The side surface portion 510*d* and the side surface portion 510*e* are spaced apart from each other.

An inner side of the lower end of the recess in the housing 510, that is, a portion of the third surface 510*c* opposing the rail 10 (FIG. 5) is provided with a tapered portion 511 that projects inwardly. The provision of the tapered portion 511 in the housing 510 prevents dust or the like from entering into the lubricating oil supply device 500. In other words, the tapered portion 511 serves as a seal of the lubricating oil supply device 500. The tip end of the tapered portion 511 may be formed so as to be slightly separated from the rail 10, or may be formed to abut against the rail 10. The third surface 510*c* has a thick-walled portion 513 formed to be thicker than the other portions of the bottom surface.

The first surface 510*a* and the second surface 510*b* of the housing 510 have their inner surfaces provided with protruding portions 512*a* (not shown) and 512*b*, respectively. With the protruding portions 512*a* and 512*b*, the lubricating member 530 is held in place inside the housing 510 so that it does not move more than necessary. The first surface 510*a* and the second surface 510*b* have two holes 515 on the right and left through which the screws 81 as the first fixing members are inserted, and a hole 517 at the center through which the screw 82 as the second fixing member is inserted. The hole 517 has a diameter adapted to the diameter of the head of the screw 82. The housing 510 can be made, for example, of resin, steel, or a combination thereof, although the material is not particularly limited.

Figure 5:
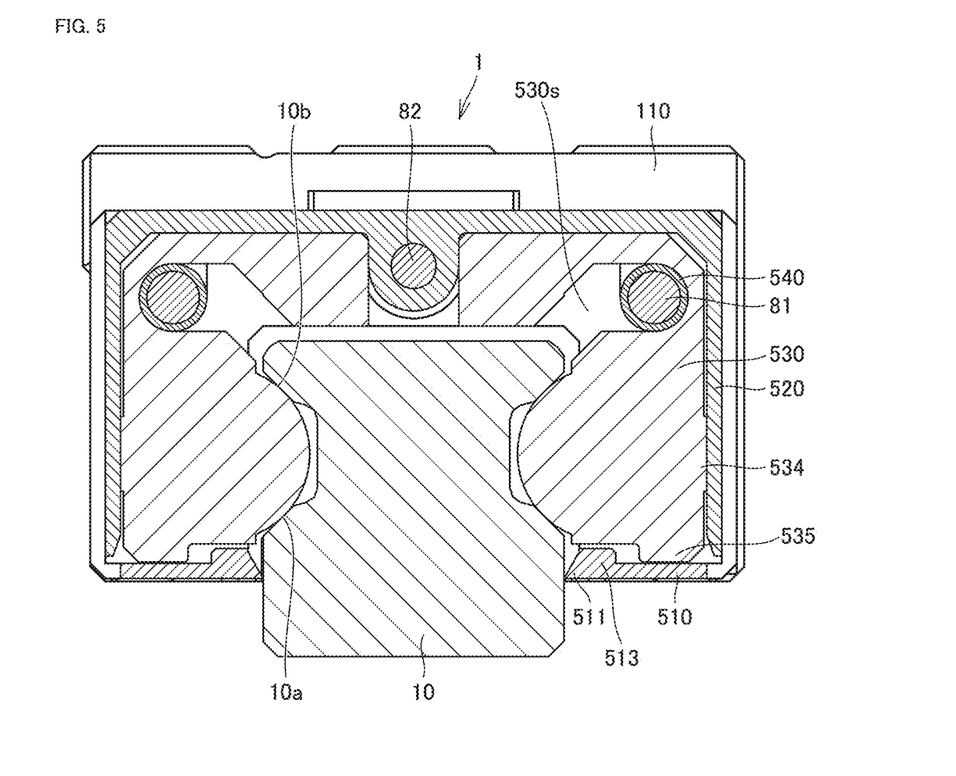
FIG. 5 is a cross-sectional schematic diagram of the linear motion guide unit in Embodiment 1.

FIG. 5 is a cross-sectional schematic diagram of the linear motion guide unit 1, which shows a cross section taken along A-A in FIG. 1A Referring to FIGS. 3, 4, and 5, the lubricating member 530 is composed of two members divided into right and left with respect to the longitudinal direction of the rail 10, which are housed in the housing 510. The lubricating member 530 has a thickness $L_3$ that is smaller than the inner dimension $L_1$ between the first surface 510*a* and the second surface 510*b* of the housing 510. The thickness $L_3$ is about the same as or slightly smaller than a length $L_2$ of the spacing between the side surface portion 510*d* and the side surface portion 510*e* of the housing 510.

The lubricating member 530 is made of a material capable of retaining lubricating oil and is preferably composed of a porous sintered resin member. For example, the sintered resin member is produced by filling fine particles of a synthetic resin into a predetermined mold and heating and forming them, thereby sintering them into a porous structure. Specifically, for example, fine particles of an ultra high molecular weight polyethylene resin can be sintered and formed to be used as the sintered resin member. The ultra high molecular weight polyethylene resin powder for use may have a particle size of, for example, 30 μm for fine particles and 250 μm to 300 μm for coarse particles. According to the sintered resin member produced in this manner, the machining accuracy of the formed product can be as high as about ±0.025 mm, for example. As the porous structure, a structure composed of open pores with a porosity of 40% to 50%, for example, can be used. The lubricating oil is impregnated and retained in the porous parts of the porous structure.

Figure 6:
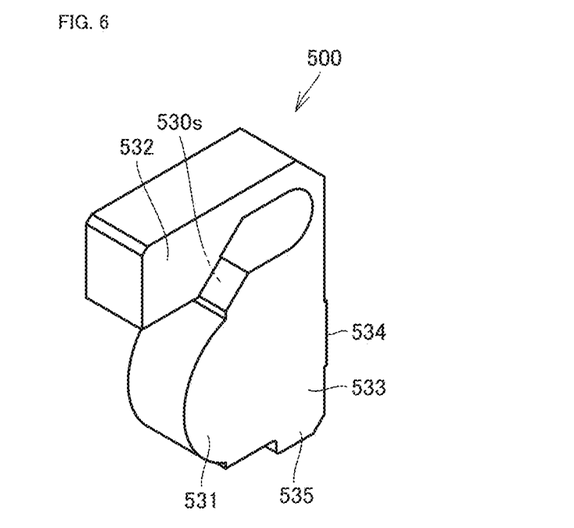
FIG. 6 is a perspective view of a lubricating member included in the lubricating oil supply device in Embodiment 1.

FIG. 6 is a perspective view showing particularly the lubricating member 530. Referring to FIGS. 4, 5, and 6, the lubricating member 530 includes a first portion 531, which is a bulging portion projecting inwardly to abut against the raceway surfaces 10a and 10b of the rail 10, a second portion 532, which is a top portion extending from a side toward the center, and a third portion 533, which is a side portion. The lubricating member 530 is shaped to avoid portions corresponding to the screws 81 and 82 so as not to interfere with the screws 81 and 82. Further, the lubricating member 530 has a groove 530s bored diagonally upward so as to enable the lubricating member 530 to be inserted and removed even in the state where the screw 81 is fixed. Even when the screw 81 is fixed, the lubricating member 530 can be removed by removing the cover 520 and pulling the lubricating member 530 diagonally upward along the groove 530s. The lubricating member 530 formed in this shape is removable, and also secures a large volume, thereby retaining sufficient lubricating oil.

On a side surface of the third portion 533 of the lubricating member 530, a protruding portion 534 is formed to project outwardly in the width direction. The protruding portion 534 is provided at a position corresponding to the raceway surfaces 10a and 10b of the rail 10 in the height direction. The protruding portion 534 abuts against the cover 520 and is pushed inwardly by the cover 520. With this configuration, the first portion 531 as the bulging portion is pressed against the rail 10, enabling the lubricating oil to be applied efficiently. The position and size of the protruding portion 534 and the height of the protrusion can be changed according to the dimensions of the rail, the degree of lubrication required, and so on. The protruding portion 534 may be eliminated and the entire side surface of the lubricating member 530 may be configured to abut against the cover 520. On the bottom surface of the third portion 533, a convex portion 535 is formed to project downwardly. The convex portion 535 and the thick-walled portion 513 of the housing 510 fitted to each other facilitate the positioning of the lubricating member 530 and the housing 510.

Referring to FIGS. 4 and 5, for the purposes of securing a certain distance between the first surface 510a and the second surface 510b of the housing 510 and protecting the lubricating member 530, a collar 540 is disposed at a position where the screw 81 as the first fixing member is inserted. The collar 540 is a tube-shaped member made of metal or resin. The collar 540 has a thickness $L_4$ approximately equal to the inner dimension $L_1$ between the first surface 510a and the second surface 510b of the housing 510.

Figure 7:
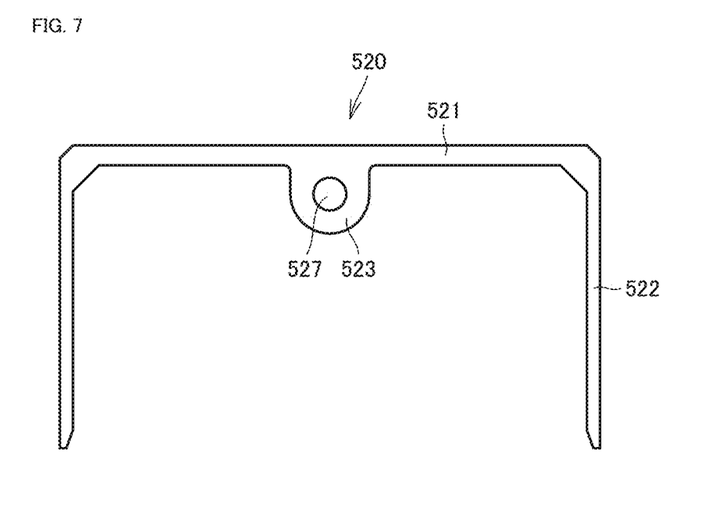
FIG. 7 is a plan view of a cover included in the lubricating oil supply device in Embodiment 1.
Figure 8:
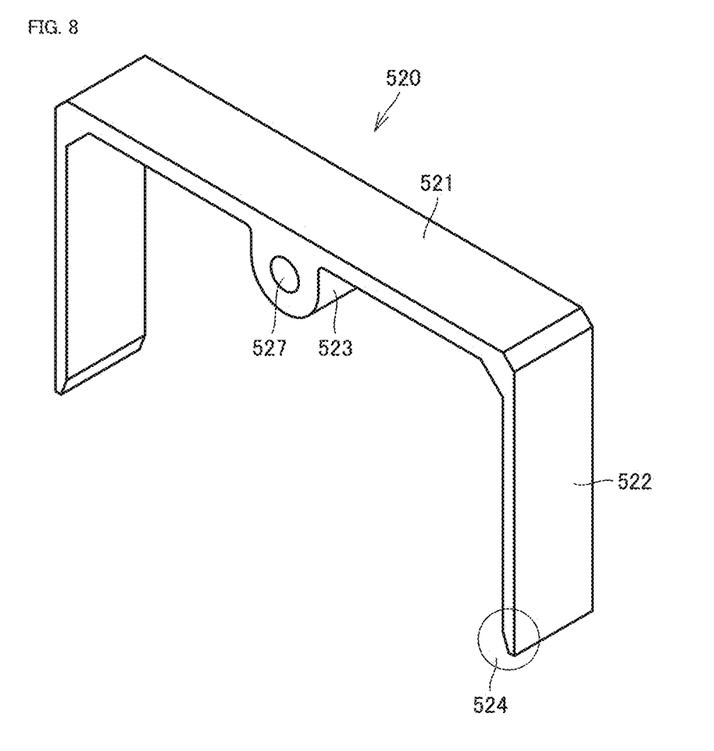
FIG. 8 is a perspective view of the cover included in the lubricating oil supply device in Embodiment 1.

FIG. 7 is a plan view of the cover 520 included in the lubricating oil supply device 500. FIG. 8 is a perspective view of the cover 520. Referring to FIGS. 4, 7, and 8, the cover 520 includes a top portion 521 extending in the width direction, and side portions 522 hanging down from both ends of the top portion 521. The top portion 521 has its lower surface provided with a portion 523 at the center. The portion 523 is a protruding portion having a hole 527, which is a screw hole through which the screw 82 (FIG. 5) as the second fixing member is inserted. The hole 527 is formed at a position corresponding to the hole 517 in the housing 510. The hole 527 has a diameter adapted to the diameter of the body of the screw 82. The cover 520 is composed of the top and side portions. The side portions of the cover 520 does not include any portion that projects inwardly in the width direction. Further, the cover 520 is shaped to eliminate portions corresponding to the screws 81 and the collar 540 so as not to interfere with the screws 81 and the collar 540. With these configurations, even when the screws 81 are fixed, the cover 520 is not fixed by the screws 81 and can be removed and reattached.

Referring to FIG. 4, the cover 520 has a thickness $L_5$ approximately equal to the thickness $L_3$ of the lubricating member 530. The thickness $L_5$ of the cover 520 is greater than the length $L_2$ of the spacing between the side surface portion 510d and the side surface portion 510e of the housing 510. With this configuration, the side portion of the cover 520 is held by the side surface portion 510d and the side surface portion 510e. Further, the thickness $L_5$ of the cover 520 is about 0.1 mm to about 1 mm smaller than the inner dimension $L_1$ of the housing 510 and the thickness $L_4$ of the collar 540. With this configuration, only the cover 520 can be removed while the housing 510 and the collar 540 remain fixed. The cover 520 can be made, for example, of resin, steel, or a combination thereof, although the material is not particularly limited.

Referring to FIGS. 7 and 8, the side portion 522 of the cover 520 has a tapered portion 524 that tapers toward the tip end. The tapered portion 524 makes it easier to insert the cover 520 into the housing 510. Further, the bent portion between the top portion 521 and the side portion 522 in the cover 520 has a chamfered outer surface and a thick-walled inner surface. This form improves the strength of the cover 520 and prevents it from being damaged during removal or insertion.

The lubricating oil supply device 500 having the above-described configuration enables the lubricating member 530 to be replaced without the need to loosen the screws 81 securing the end cap 120. Further, the lubricating member 530 can be easily replaced by removing the cover 520 of the housing 510 in which the lubricating member 530 is disposed. When the linear motion guide unit is used for a long period of time, wear particles may be generated from the raceway surfaces, and the lubricating member may be clogged with the wear particles. According to the lubricating oil supply device 500, the lubricating member 530 can be easily replaced, ensuring good maintainability.

The other configurations of the linear motion guide unit 1 will now be described.

Referring to FIGS. 1B and 2, in the linear motion guide unit 1, rolling elements 200a rolling in the circulation passage 103a circulate from the load-carrying race 102a on the lower side of the carriage 110 to the circulation passage 103a on the upper side of the carriage 110. The rolling elements 200a receive a downward load of the slider 100. Rolling elements 200b rolling in the circulation passage 103b are configured to circulate from the load-carrying race 102b on the upper side of the carriage 110 to the circulation passage 103b on the lower side thereof. The rolling elements 200b receive an upward load of the slider 100.

Referring to FIGS. 1B and 9, in the linear motion guide unit 1, two second circulation passages (turnaround passages) are formed in the end cap 120, which connect between the load-carrying race 102a and the circulation passage 103a and between the load-carrying race 102b and the circulation passage 103b, respectively. The two second circulation passages are formed in the end cap 120 in a crossed state. On a side of the end cap 120 that is connected to the circulation passage 103a, a protrusion having an outer circumferential surface made of a cylindrical surface is provided to facilitate positioning when the end cap 120 is mounted. The end cap 120 is formed in a U-shape in cross section so as to straddle the rail 10. The end cap 120 has a hole 127 formed on the upper center, which is a screw hole into which the grease nipple 31 can be inserted. When the lubricating oil supply device 500 is mounted on the outer side of the end cap 120, the hole 127 is not used as a grease introduction hole and, thus, a plug 128 is inserted therein. At the end face where the lubricating oil supply device 500 is not mounted, a fixing screw may be inserted into the hole 147 of the end seal 140 and the hole 127 of the end cap 120 to secure the end seal 140 and the end cap 120. A spacer constituting a portion of the second circulation passage may be disposed between the carriage 110 and the end cap 120. The end cap 120 may have an oil groove that guides the lubricant introduced from the grease nipple 31. The end cap 120 may have a hook in a position at the bottom opposing the rail 10, for arrangement of an underseal 129.

Referring to FIG. 2, the circulation passages 103a and 103b may each be formed with a combination of halved pipes 111 and 112 along the longitudinal direction. The outer peripheral surfaces of the pipes 11l and 112 are partly formed in an arc shape along a peripheral wall defining a cylindrical hole 118 formed in the carriage 110. The inner peripheral surfaces of the pipes 111 and 112 constitute the circulation passages 103a and 103b which are rectangular in cross section and extend in the longitudinal direction. The pipes 111 and 112 may have their ends formed to fit with protrusions formed in the end cap 120. The pipes 111 and 112 may be composed of sintered resin members that are impregnated with lubricating oil and capable of retaining the lubricating oil. The pipes 111 and 112 composed of sintered resin members that are capable of retaining the lubricating oil further improve the maintainability of the linear motion guide unit 1.

Referring to FIGS. 1B and 2, the rolling elements 200 rolling on the load-carrying races 102a and 102b are held by a retaining plate 131 and a retaining band 132 so that the rolling elements 200 do not fall off even when the slider 100 is detached from the rail 10. The retaining plate 131 has aside opposing the carriage 110 provided with a V-shaped groove that extends in the length direction. The retaining plate 131 has a side opposing the rail 10 provided with an outwardly concave groove that extends in the longitudinal direction. The retaining band 132 is arranged in this concave groove. The retaining band 132 is formed to have its both ends fitted into a retaining band groove 126 (FIG. 9) of the end cap 120.

Generally, when replenishing a lubricating part with oil, it is difficult to visually determine how much lubricating oil has actually been replenished to the lubricating part. According to the linear motion guide unit of the present disclosure, the lubricating parts themselves can be replaced to ensure replenishment of the lubricating oil. In addition, by replacing the lubricating parts themselves, clogging of the lubricating parts with particles generated due to wear and the like can be suppressed. According to the linear motion guide unit of the present disclosure, it is not necessary to remove the lubricating oil supply device from the rail when replacing the lubricating parts. Furthermore, the lubricating parts can be replaced while the end seal and the like are fixed. Therefore, there is little risk of the end seal or the like being displaced during replenishment of the oil or during replacement of the lubricating parts, and maintenance can be easily performed at the site where the linear motion guide unit is in operation.

<Variation>

Figure 10:
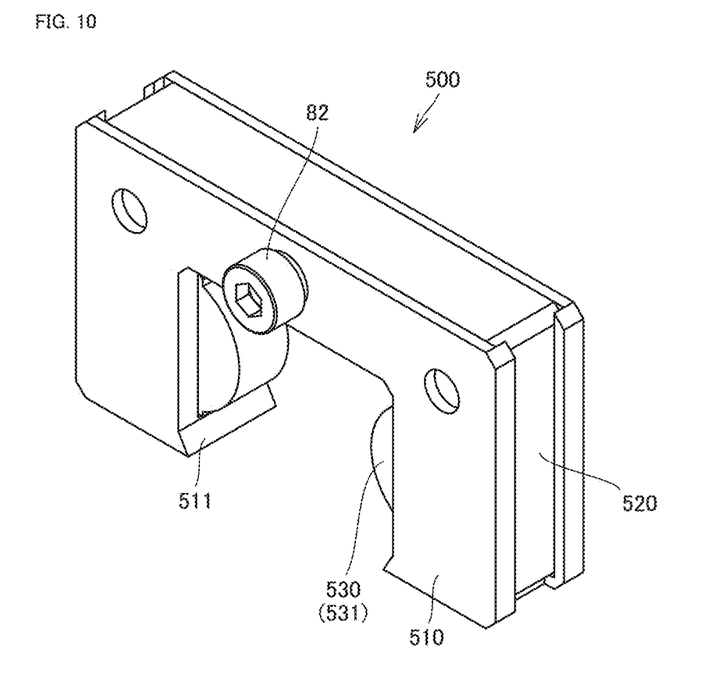
FIG. 10 shows a variation of the lubricating oil supply device modified in shape of the housing.

Embodiment 1 described above is merely one embodiment, in which many configurations can be changed. For example, the shape of the opening of the housing 510 in the lubricating oil supply device 501 is not limited to the shape conforming to the rail 10. Specifically, referring to FIG. 10, the convex portion 514 (FIG. 3) may be eliminated and the opening may be a recess that is cut out into a rectangular shape with an opening width wider than the width of the rail 10. Even in the case of making the rectangularly cut-out recess, it is preferable to provide the tapered portion 511 at the bottom. The shapes of the cover 520 and the lubricating member 530 can also be changed as long as they produce the effects of the present disclosure. Further, while the lubricating oil supply device 500 has the structure in which screws 81 as the first fixing members are provided at two (right and left) positions and a screw 82 as the second fixing member is provided at one (central) position, the structure is not limited thereto. For example, the cover may be divided into two (right and left) pieces, and the second fixing members may also be provided at two locations, so that the right and left lubricating members can be replaced independently of each other.

In Embodiment 1, the linear motion guide unit has two pairs of rolling element circulation passages and uses rollers as the rolling elements. However, the forms of the rolling elements and their passages are not limited thereto. For example, there may be one pair of rolling element circulation passages. Further, balls may be used as the rolling elements. A separator may be disposed to maintain the spacing between the rolling elements.

In Embodiment 1, the lubricating oil supply device 500 is arranged only on one side of the slider 100. However, the lubricating oil supply device 500 may be arranged on both sides of the carriage 110. Further, the grease nipple 31 can be omitted if, for example, sufficient lubricating oil can be supplied only with the lubricating oil supply device 500.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

DESCRIPTION OF REFERENCE NUMERALS

1: linear motion guide unit; 10: rail; 100: slider; 110: carriage; 102a, 102b: load-carrying race; 103a, 103b: circulation passage; 111, 112: pipe; 120: 125: hole: end cap; 126: retaining band groove; 128: plug; 129: underseal; 131: retaining plate; 132: retaining band; 140: end seal; 200, 200a, 200b: rolling element; 31: grease nipple; 500: lubricating oil supply device; 510: housing; 511: tapered portion; 512a, 512b: protruding portion; 513: thick-walled portion; 514: convex portion; 520: cover; 521: top portion; 522: side portion; 523: portion; 524: tapered portion; 527: hole: 530: lubricating member; 530s: grove: 531: first portion; 532: second portion; 533: third portion; 534: protruding portion; 535: convex portion; 540: collar; 81, 82: screw; 11, 101, 115, 118, 127, 145, 147, 515, 517; hole; 10a, 10b, 110a, 110b: raceway surface; 510a, 510b, 510c: surface; and 510d, 510e: side surface portion.

What is claimed is:

1. A linear motion guide unit comprising a rail, a slider slidable relative to the rail, and rolling elements rollable in a rolling groove formed with the rail and the slider,
    the slider having a lubricating oil supply device provided at least at one end face thereof,
    the lubricating oil supply device including
        a lubricating member that retains lubricating oil and abuts against a raceway surface of the rail to supply the lubricating oil to the rail,
        a housing having a front surface, a rear surface, and a bottom surface covering a front surface, a rear surface, and a bottom surface of the lubricating member, with an upper surface of the housing having an opening, and
        a cover that covers at least an upper surface of the lubricating member,
    the housing being fixed to the slider with a first fixing member,
    the cover being fixed to the housing with a second fixing member, without being fixed with the first fixing member.

2. The linear motion guide unit according to claim 1, wherein the cover includes a top portion that covers the upper surface of the lubricating member, and two side portions that extend from both ends of the top portion and cover side surfaces of the lubricating member.

3. The linear motion guide unit according to claim 2, wherein the cover has tip ends of the side portions formed with a tapered shape.

4. The linear motion guide unit according to claim 1, wherein the housing further has side surface portions that extend in a longitudinal direction of the rail from outer ends of the front surface and the rear surface, respectively, the side surface portion extending from the front surface and the side surface portion extending from the rear surface having a spacing therebetween.

5. The linear motion guide unit according to claim 4, wherein
    the lubricating member is composed of two members on right and left sides with respect to a longitudinal direction of the rail, and
    the lubricating member has a thickness that is equal to or smaller than a width of the spacing between the side surface portion extending from the front surface and the side surface portion extending from the rear surface of the housing.

6. The linear motion guide unit according to claim 1, wherein the lubricating member has a protruding portion that protrudes outwardly from a side surface of the lubricating member in a direction away from the rail at a position that corresponds to raceway surfaces provided in the rail.

7. The linear motion guide unit according to claim 1, wherein the housing has, at a portion of the bottom surface opposing the rail, a tapered portion that protrudes toward the rail.

* * * * *